United States Patent
Ireson

(10) Patent No.: US 6,201,765 B1
(45) Date of Patent: Mar. 13, 2001

(54) METHOD OF MONITORING QUALITY OF SEISMIC DATA PROCESSING AND METHOD OF PROCESSING VERTICAL SEISMIC PROFILE DATA

(75) Inventor: Richard Linney Ireson, Tunbridge Wells (GB)

(73) Assignee: Geco-Prakle (UK) Limited, Gatwick (GB)

( * ) Notice: Subject to any disclaimer, the term of this patent is extended or adjusted under 35 U.S.C. 154(b) by 0 days.

(21) Appl. No.: 09/077,326

(22) PCT Filed: Nov. 19, 1996

(86) PCT No.: PCT/GB96/02835

§ 371 Date: May 27, 1998

§ 102(e) Date: May 27, 1998

(87) PCT Pub. No.: WO97/20235

PCT Pub. Date: Jun. 5, 1997

(30) Foreign Application Priority Data

Nov. 27, 1995  (GB) .................................................. 9524191

(51) Int. Cl.⁷ .................................................. G01V 1/28
(52) U.S. Cl. ................................................. 367/38; 367/72
(58) Field of Search ................................. 702/14; 367/57, 367/72

(56) References Cited

U.S. PATENT DOCUMENTS

| | | | |
|---|---|---|---|
| 4,627,036 | 12/1986 | Wyatt | 367/57 |
| 4,802,146 | * 1/1989 | Moeckel | 367/57 |
| 4,802,147 | * 1/1989 | Moeckel | 367/57 |
| 4,894,809 | 1/1990 | Moeckel | 367/57 |

OTHER PUBLICATIONS

Geophysics, vol. 58, No. 1, Zimmerman et al, "Comparison of Vertical Seismic Profiling Techniques", p. 139, Jan. 1, 1993.

Revue de L'Institut Francais du Petrole, vol. 44, No. 4, "La Sismique De Puits Le Profil Sismique . . . ", p. 420, Jul. 1, 1989.

* cited by examiner

*Primary Examiner*—Christine K. Oda
*Assistant Examiner*—Victor J. Taylor
(74) *Attorney, Agent, or Firm*—Jacobson, Price, Holman & Stern, PLLC

(57) ABSTRACT

The processing of surface seismic data may be monitored where vertical seismic profile data are available for the same region. A trace (45) of the vertical seismic profile data recorded from a geophone at the surface is compared with data generated by the data processing before completion of migration and provides a measure of the quality of the data processing. Alternatively, a derived trace may be derived by taking sections of the vertical seismic profile data traces along a section curve (47). The derived trace may be thought of as partially migrated data and may similarly be used for monitoring the quality of surface seismic data processing.

13 Claims, 9 Drawing Sheets

METHOD OF MONITORING QUALITY OF SEISMIC DATA PROCESSING AND METHOD OF PROCESSING VERTICAL SEISMIC PROFILE DATA

BACKGROUND OF THE INVENTION

Field of the Invention

The present invention relates to a method of monitoring the quality of surface seismic data processing and to a method of processing vertical seismic profile data.

Surface seismic exploration can be performed in a 2D or a 3D mode. The 2D mode is simpler to describe. FIG. 1 of the accompanying drawings is a schematic illustration of a simple 2D land based seismic survey arrangement, although a similar surveying process can also be carried out at sea. Only two sources and two receivers will be considered for simplicity. The two sources $S_1$ and $S_2$ are regularly spaced in an array to one side of an origin O. The two receivers $R_1$ and $R_2$ are also regularly spaced in an array on the other side of the origin O. The sources and receivers are arranged such that the origin is the midpoint $M_1$ of a first source and receiver pair formed by $S_1$ and $R_1$, and also the midpoint $M_2$ of a second source and receiver pair formed by $S_2$ and $R_2$. The distance between a source and a receiver is known as an "offset".

If a reflector 2 beneath the survey arrangement of FIG. 1 is horizontal, then seismic energy emitted by the first source $S_1$ will be received by the first receiver $R_1$, whereas seismic energy emitted by the second source $S_2$ will be received by the second receiver $R_2$. In FIG. 1, the midpoints of the two described source receiver pairs are at the origin O, and the reflections occur directly below the midpoints $M_1$ and $M_2$.

In practice, the seismic energy sources are actuated in turn, and each receiver receives reflected signals. The traces of received signals are then assigned to a position which is the midpoint between the respective receiver and the source that was actuated.

The presence of non-horizontal reflectors, known as dipping reflectors, changes the situation, as shown in FIG. 2 of the accompanying drawings. The same pairs of sources $S_1$, $S_2$ and receivers $R_1$, $R_2$ do not now have a common reflection point on the dipping reflector, neither of the reflection points being at the actual midpoint M between the sources and receivers. During a processing sequence described hereinafter, the object of a migration step is to determine the location of the actual reflection points, which, before migration, are assumed to have occurred below the midpoint M as would occur with a horizontal reflector.

This problem has been accounted for in the steps developed to process surface seismic data. The processing of surface seismic data generally includes a number of steps, each of which is intended to improve the data quality. The processing often includes the steps of:

1) Designature—The shape of the input energy signature is extracted from the seismic data and is then converted to one of a known property which allows improved data processing performance within the subsequent steps;
2) Gather—The seismic data are recorded such that energy reflecting (or apparently reflecting) from the same point on a sub-surface is grouped together. These are commonly called common mid points CMP or common depth points CDP;
3) Velocity analysis—The data within the CMPs contain information from varying source receiver offsets. The time at which reflection from a given point on a reflecting surface will be recorded varies with source receiver offset and sub-surface velocity. The varying time delay as a function of offset is exploited in order to determine the subsurface velocity profile;
4) Deconvolution—Energy propagating from a source to a receiver may undergo multiple reflections in addition to single "primary" reflectors. These spurious multiple reflections are attenuated by the deconvolution step. The deconvolution process can compress the time series wavelet which represents reflection at any given reflector and as such is an aid to increasing resolution of closely spaced reflectors.
5) Stack—The velocity profile derived at step 3 is used to correct the recorded offset data to simulate data recorded at zero offset. The corrected traces are then added together to enhance a "primary" signal at the expense of ill corrected or non-primary energy.
6) Migration—The gather and stack processing steps assumed that the reflectors are horizontal. This results in errors as indicated with respect to FIG. 2. The migration step moves any non-horizontal reflectors to their correct spatial position and also focuses the seismic image;
7) Filtering—To remove frequencies not considered as primary reflection energy.

Each process changes the data. It would be desirable to monitor how each process step affects a reflectivity sequence and embedded wavelet contained within the surface seismic data.

Surface seismic acquisition is not the only way to obtain seismic data. Data may also be obtained by drilling a borehole and placing an array of receivers on the ground surface and a seismic source in the borehole, or by placing a seismic source on the surface, and an array of receivers at various depths down the borehole. The latter option is the more common arrangement. The resulting data are known as a borehole vertical seismic profile.

A simplified arrangement is schematically illustrated in FIG. 3 of the accompanying drawings. A seismic energy source $S_b$ is located at the top of a borehole 6 (represented by a dotted line in FIG. 3). Geophones $G_1$ to $G_8$ are located in a regular linear array at different depths within the borehole.

Seismic energy resulting from actuation of the source can travel directly towards each of the geophones and the delay between actuation of the source and arrival of the seismic energy can be used to derive a velocity profile for seismic energy within the rocks through which the borehole passes. This directly received seismic signal is not illustrated in FIG. 3. However, as illustrated, seismic energy reflected directly from reflectors deeper than the geophones can be recorded. Seismic energy paths for geophones $G_1$, $G_4$ and $G_8$ have been illustrated. Some of the paths have been slightly displaced with respect to one another to improve the clarity of the diagram.

A first path 8 represents energy that travels to the first reflector 2 and is reflected to the first geophone $G_1$. A second path 10 represents energy that travels to the second reflector 4 and is reflected to the geophone $G_1$. A third path 12 represents energy that travels to the first reflector 2 and is reflected to the geophone $G_4$ just above the first reflector 2. A fourth path 14 represents energy that is reflected from the second reflector 4 to the geophone $G_4$. A fifth path 16 represents energy that is reflected from the second reflector 4 to the geophone $G_8$ located just above the second reflector 4. The presence of a dipping reflector 4 enables energy reflected from points positioned away from the path of the borehole to be received by geophones located higher up in the borehole than the reflector 4.

FIG. 4 of the accompanying drawings schematically illustrates the seismic record or trace recorded by each of the geophones $G_1$ to $G_8$. Only reflection signals are shown. Direct arrival signals have been omitted for clarity although, in order to generate a plot of the type shown in FIG. 4, the direct arrival time from the source to a respective geophone is added to the recorded reflection time by statically shifting each trace downwards by an amount equal to its own direct arrival time. In the absence of dip, such a time shifting causes upward reflections to line up at their correct reflection times below the surface. Thus, the first signals in the traces of geophones $G_1$ to $G_4$ resulting from reflection at the first reflector 2 become aligned in time. The diagonal line 20 represents the two way travel time from the source to each geophone. The origin in depth of a reflection event is precisely identified when the reflection event is coincident with the line 20. Thus the first reflection in the trace for $G_4$ and the second reflection in the trace for $G_8$ can be identified as coming from reflectors whose depths correspond to the positions of $G_4$ and $G_8$ within the borehole.

The reflections at the second dipping reflector 4 do not line up in travel time but follow a hyperbolic curve. However, the time of the reflection signal on the trace for the geophone $G_8$ corresponds to the migrated time for the corresponding reflection event in the surface seismic data. The second reflection event on the trace for $G_1$ corresponds to the zero offset unmigrated surface seismic data. This is because, when the geophone and source are nearly coincident at the surface, the trace recorded is identical to the recorded zero offset surface seismic trace i.e. before migration. Thus, the position in time of the second reflection on the trace for geophone $G_1$ is the same as the unmigrated surface seismic time, and the position in time of the second reflection on the trace for the geophone $G_8$ is the same as the migrated surface seismic time.

Similarly, for the first reflector, the reflection event is correctly placed in time for trace $G_1$ relative to the unmigrated surface seismic data, and correctly placed in time for trace $G_4$ relative to the migrated surface seismic data. Since the first reflector is flat, the migrated and unmigrated times are the same. In the presence of dip, the unmigrated time is less than the migrated time.

It is known to compare borehole vertical seismic profile data with surface seismic data. However, except in the absence of dip, such a comparison cannot be made until after the surface seismic data have been migrated to a position equivalent to that of the borehole.

SUMMARY OF THE INVENTION

According to a first aspect of the invention, there is provided a method as defined in the as a method of monitoring the quality of surface seismic data processing of surface seismic data relating to a region for which vertical seismic profile data are available. The method includes selecting, from vertical seismic profile data traces, a trace corresponding to least depth. Additionally, the method compares the selected trace with data generated by the data processing, and then represent at least partially processed unmigrated surface seismic data so as to provide a measure of the quality of the data processing.

Additionally, the method of monitoring the quality of surface seismic data processing of surface seismic data relating to a region for which vertical seismic profile data are available, includes the steps of correcting the vertical seismic profile data traces so that the reflections on vertical seismic profile data traces align at the same time. From the corrected vertical seismic profile data traces, a trace corresponding to least depth is selected and compared with data generated by the data processing. This represents at least partially processed unmigrated surface seismic data, so as to provide a measure of the quality of the data processing.

Also, the method of monitoring the quality of surface seismic data processing of surface seismic data relating to a region for which vertical seismic profile data are available, includes the step of correcting the vertical seismic profile data traces so that the reflections on vertical seismic profile data traces align at the same time. From this a trace from two or more of the corrected vertical seismic profile data traces is derived. The method then compares the sum trace with data generated by the data processing and represents at least partially processed unmigrated surface seismic data so as to provide a measure of the quality of the data processing.

According to a second aspect of the invention, there is provided a method as defined as a method of processing n vertical seismic profile data traces, where n is an integer greater than one, corresponding to different depths such that each ith trace corresponds to a larger depth than each (i−1)th trace, where i=2, . . . , n. The method includes deriving a derived trace from the n data traces by selecting from the first trace a first section whose start time is equal to the start time of the first trace, and selecting from each jth trace a jth section whose start time is equal to the end time of the (j−1)th section and is greater than the start time of the jth trace, where j=2, . . . , n, the end time of the nth section being equal to the end time of the nth trace.

Preferred embodiments of the invention are defined in the other steps of the method in which the selected trace corresponds to zero depth. Alternatively, in which the vertical seismic profile data traces comprises a first set of traces which were obtained by seismic data acquisition and all of which correspond to non-zero depth. A second set of traces comprises a synthetic trace corresponding to zero depth and derived by extrapolation from at least one of the traces of the first set, the selected trace comprising the synthetic trace. The method step in which the comparing step comprises correlation.

The method in which an mth to the nth traces were obtained by seismic data acquisition, where 1<m<n, and the or each lth trace is derived by extrapolation from at least one of the mth to nth traces, where 1<l<m. Additionally, the selected trace corresponds to zero depth.

The method of monitoring the quality of surface seismic data processing of surface seismic data relating to a region for which vertical seismic profile data are available, wherein the steps of performing also includes comparing the derived trace with at least partially processed surface seismic data so as to provide a measure of the quality of the data processing. And the at least partially processed surface seismic data comprise at least partially migrated surface seismic data, and in which the selected trace corresponds to zero depth.

It has been found that, by selecting the vertical seismic profile data trace corresponding to least depth, for instance, of a geophone located in a borehole, it is possible to perform quality control of surface seismic data processing at intermediate stages of such processing and, in particular, prior to migration. For instance, this allows parameters of the various processing steps to be optimised so as to improve the quality of the data processing. Additionally or alternatively, the quality of processing can be assessed at various intermediate stages so as to determine whether the processing meets predetermined quality criteria. In the case where the selected trace corresponds to zero depth, for instance with source and geophone at the top of a borehole, the trace effectively comprises unmigrated zero offset data. Where such a trace is not available, it has been found possible to extrapolate from the available vertical seismic profile traces so as to simulate a trace corresponding to zero depth.

By deriving various other traces from existing vertical seismic profile data traces other than those described above, it is possible to perform quality control of surface seismic data processing at intermediate stages and, again, prior to migration. Such derived traces may not in general have any physical significance but can give useful indications of the quality and effectiveness of seismic processing prior to and during migration. Different derived traces comprising different sections of the vertical seismic profile data traces may be derived for use in such quality control. For instance, determining which such derived trace most closely resembles a trace generated during seismic processing may allow one or more processing parameters to be adjusted or optimised or may allow assessment of the quality and effectiveness of the processing to be determined. However, the derived traces may also be useful in other applications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will be further described, by way of example, with reference to the accompanying drawings, in which:

DESCRIPTION OF THE INVENTION

Figure 1:
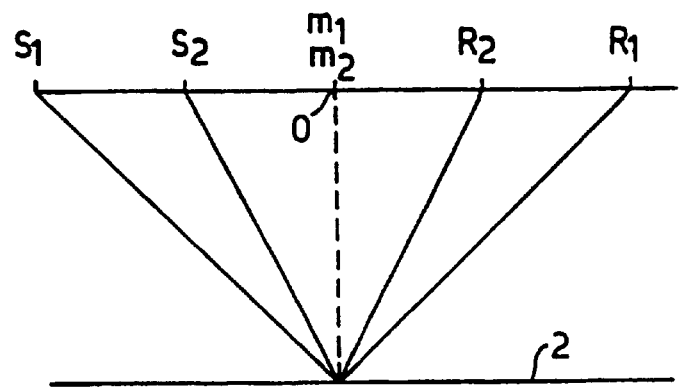
FIG. 1 is a schematic cross-section of the earth illustrating reflection of seismic energy from a horizontal reflecting surface.
Figure 2:
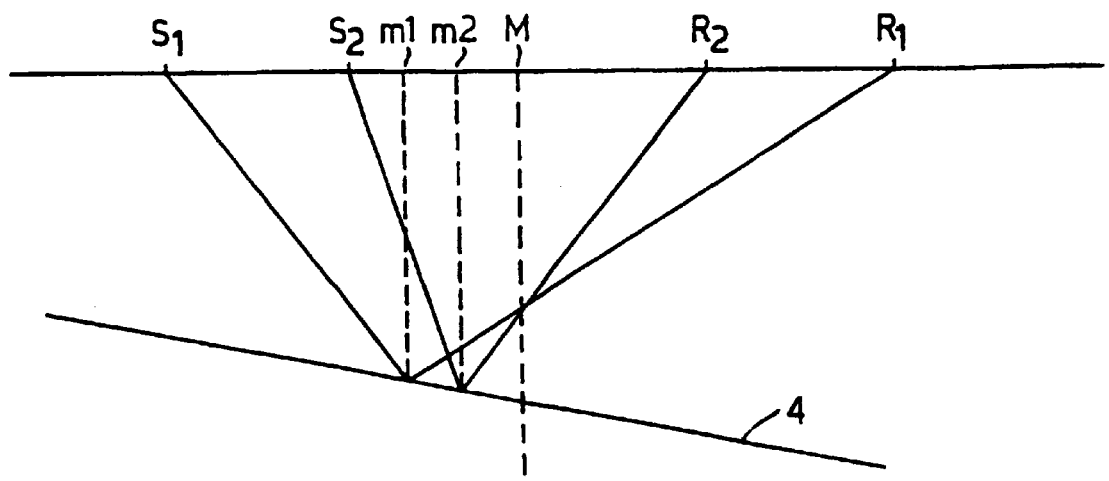
FIG. 2 shows a schematic horizontal cross-section of the earth illustrating reflection of seismic energy by an inclined or dipping reflecting surface.
Figure 3:
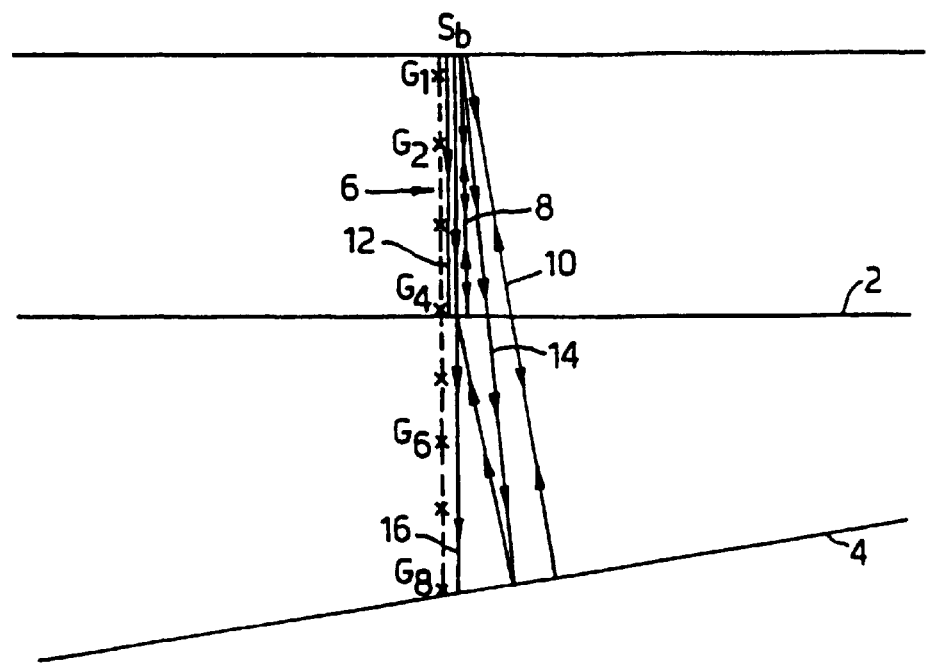
FIG. 3 shows a schematic cross-section of the earth illustrating bore hole vertical seismic data acquisition.
Figure 4:
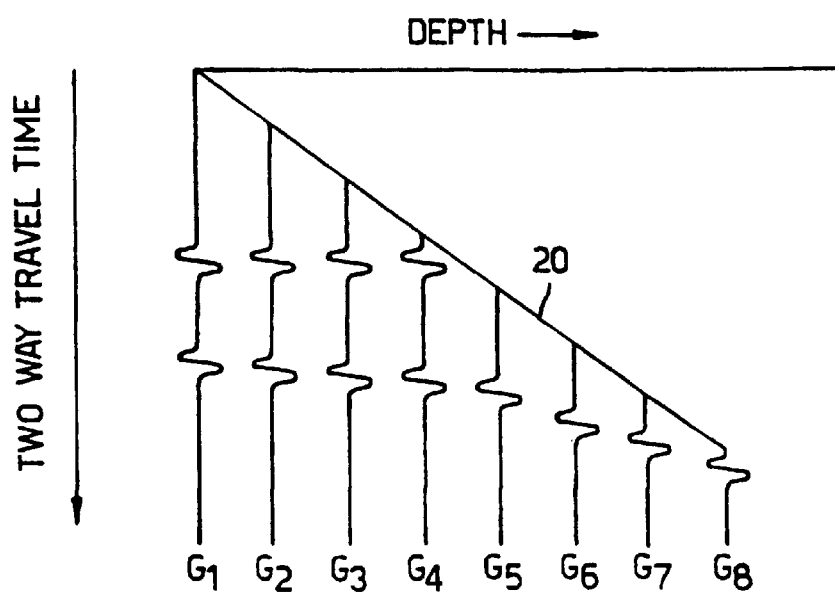
FIG. 4 is a graph illustrating simplified traces recorded by geophones in FIG. 3, with two way travel time of seismic energy being represented on the vertical downward axis and the depth of the geophones on the horizontal axis.
Figure 5:
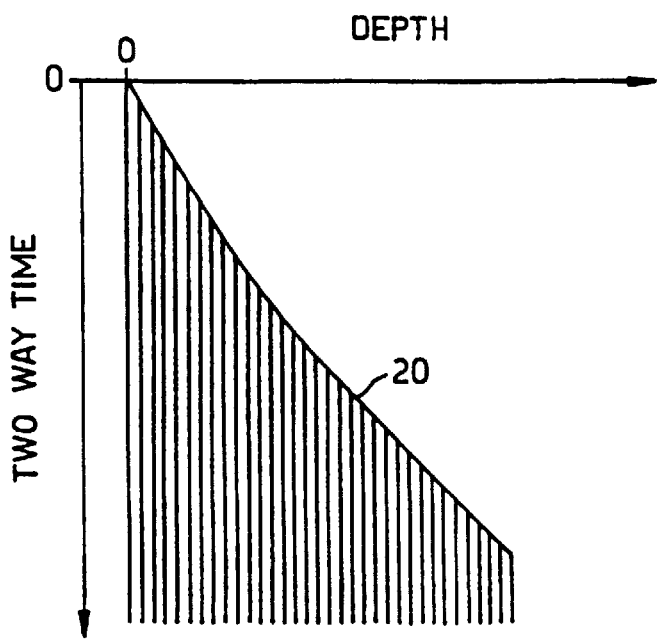
FIG. 5 illustrates a typical set of data traces of a bore hole vertical seismic profile with geophones located at regular spacings throughout the depth of the bore hole including zero depth, the axis being the same as in FIG. 4.

FIG. 5 illustrates a set of bore hole vertical seismic profile samples recorded by locating a seismic source at the surface and a plurality of geophones in a bore hole The geometry of the data was obtained by means of an arrangement similar to that shown in FIG. 3 but with many more geophones, preferably equally spaced down the bore hole and extending from the top of the bore hole (at the surface) to the bottom of the bore hole. Each of the recorded traces is illustrated as a vertical trace whose horizontal position represents the depth of the geophone and whose vertical extent indicates the time interval during which reflected seismic signals are recorded. As in the case of FIG. 4, the direct seismic energy received by each geophone is not shown but the line 20 represents the two way travel time of seismic energy from the source to each geophone. The traces are shown as straight lines for the sake of clarity but would normally have a form of the type illustrated in FIG. 4 representing the level of seismic energy received by the geophones.

Figure 6:
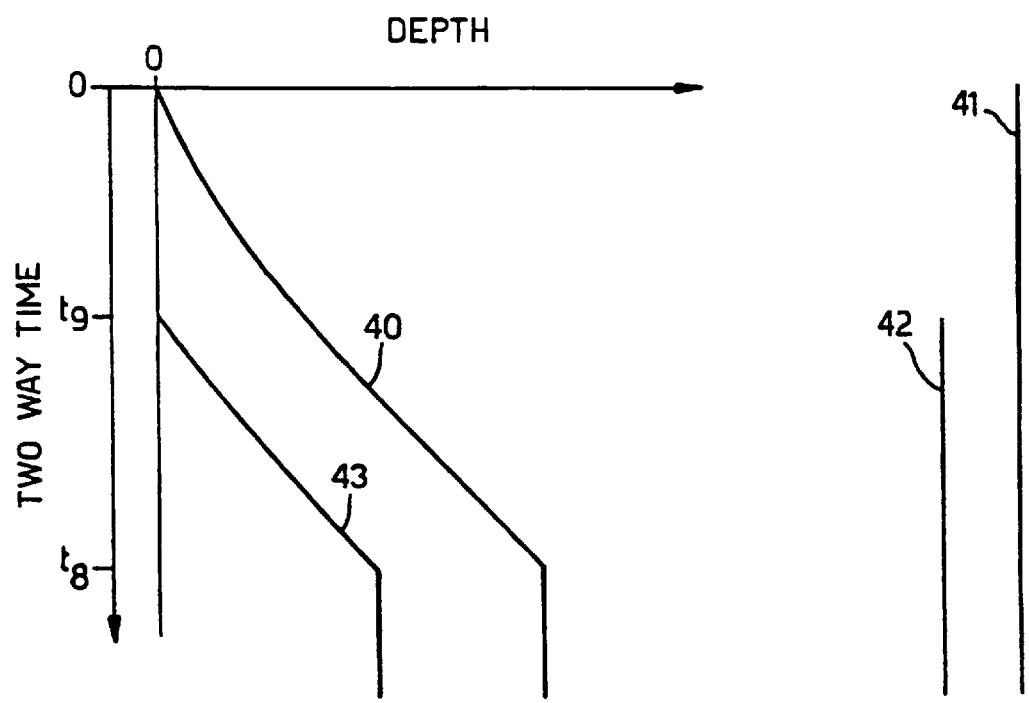
FIG. 6 illustrates known 'section curves' for the data shown in FIG. 5.
Figure 7:
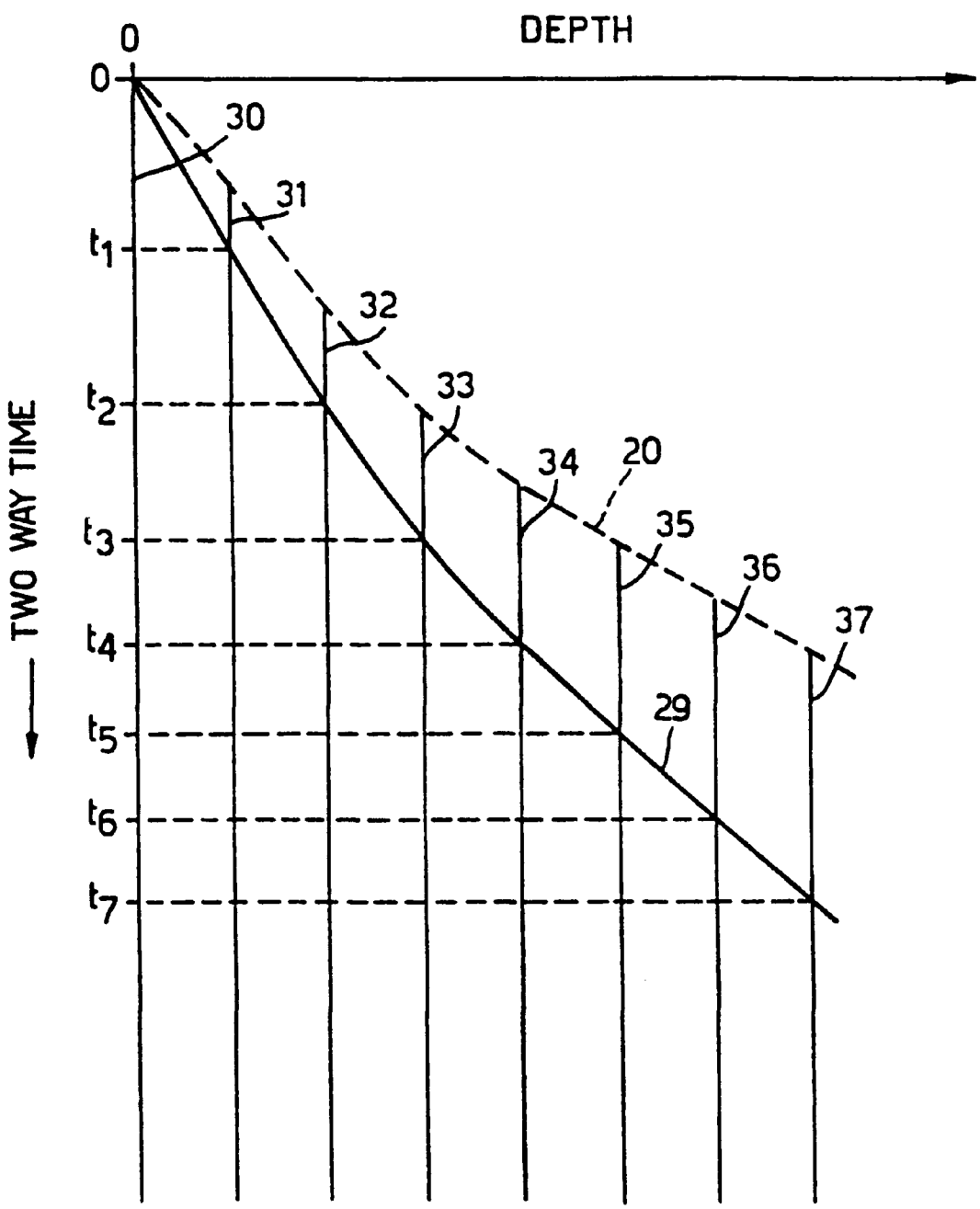
FIG. 7 illustrates part of a section curve for explaining the derivation of a derived trace.

FIG. 6 illustrates section curves of a known technique for deriving a new trace from the recorded data traces. FIG. 7 illustrates how a derived trace is obtained from a section curve defined in FIG. 4 as line 20 and the traces recorded by geophones. The section curve is shown at 29 and comprises a curve which intersects the traces 30 to 37. During a time interval from zero to $t_1$ where the section curve 29 intersects the trace 31, the derived trace comprises the section of the trace 30. During the time interval between the times $t_1$ and $t_2$ where the section curve 29 intersects the traces 31 and 32, respectively, the derived trace comprises the section between $t_1$ and $t_2$ of the trace 31. During the time interval between $t_2$ and $t_3$ where the section curve 29 intersects the traces 32 and 33, respectively, the derived trace comprises the section of the trace 32 between $t_2$ and $t_3$, and so on. Thus, the intersections of the section curve 29 with the traces define indicate the times at which the sections of the derived trace are obtained from the respective recorded data traces.

Referring again to FIG. 6, section curve 40 is applied to the data illustrated in FIG. 5 and corresponds to deriving the derived trace from the uppermost sections of the recorded data traces. When the deepest geophone trace is reached, the derived trace comprises that deepest trace. As described hereinbefore with reference to FIG. 4, the derived trace resulting from the section curve 40 shown in FIG. 6 corresponds, for the curved part of the curve 40, to migrated zero offset data in surface seismic data and extends throughout a time interval indicated by the vertical bar 41 in FIG. 6. This derived trace may be used in surface seismic data processing to assess the quality of the fully migrated data at least as far as the time $t_8$ where the curve 40 corresponds to the deepest geophone trace.

FIG. 6 illustrates another section curve 43 which extends throughout a time interval indicated by the vertical bar 42. The derived trace resulting from the section curve 43 represents a form of partially migrated or intermediate data which has been used for quality control in surface seismic data processing. However, the derived trace contains no data until time $t_9$ is reached and does not therefore permit effective quality control to be performed. Substantially less than full use of the bore hole vertical seismic profile data is achieved and the section curve is such that the derived trace is of only limited use in surface seismic data processing quality control.

Figure 8A:
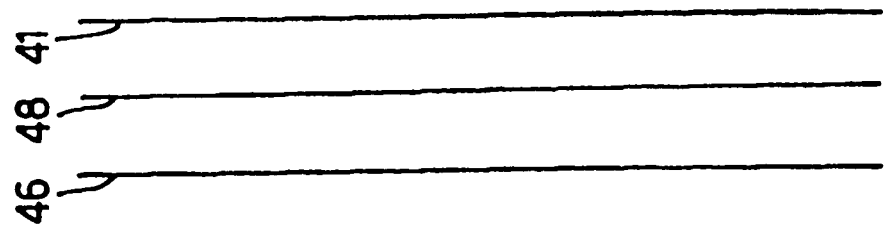
FIG. 8A illustrates section curves for an embodiment of the invention.

FIG. 8A illustrates section curves constituting embodiments of the invention for application to the data of FIG. 5. The first curve 45 comprises the trace from the geophone located substantially at the surface, i.e. substantially at zero depth. Although such measurements have been available for a long time and were recognised as corresponding to unmigrated zero offset surface seismic data, the possibility of using such a trace in the quality control of surface seismic data processing was not appreciated. It has been realised for the first time that, surprisingly, such data is useful in controlling or assessing the quality of surface seismic data processing. In particular, this trace may be used to assess the quality of partially processed surface seismic data prior to migration, for instance by cross correlation with a data trace formed during processing. The trace 45 extends throughout the recording period as indicated by the vertical bar 46 so that a full length trace is provided, for instance for correlation purposes with partially processed surface seismic data.

FIG. 8A shows a section curve 47 constituting an embodiment of the invention. The curve 47 represents an intermediate curve between the curve 40 representing fully migrated data and the curve 45 representing fully unmigrated data. The curve 47 intersects all of the actual data traces so that the derived trace is made up of a section of each and every recorded trace. Below the time $t_{10}$ where the curve 47 intersects the trace from the deepest geophone, the derived trace comprises the trace from the deepest geophone.

Although the derived trace corresponding to the section curve 47 does not have any actual physical significance, it may be thought of as representing partially migrated seismic data. As shown by the vertical bar 48, the derived trace extends throughout the trace interval and thus differs from the temporal extent of the derived trace from the known curve 43 in FIG. 6. The derived trace may therefore be used in quality control of surface seismic data processing prior to completion of or during a migration step when present. For instance, the derived trace may be cross correlated throughout the entire trace interval with a data trace generated during surface seismic data processing in order to provide a measure of the quality of the data processing. This measure may be used to alter processing parameters so as to improve the processing quality, or to establish when an adequate quality has been achieved.

Figure 8A:
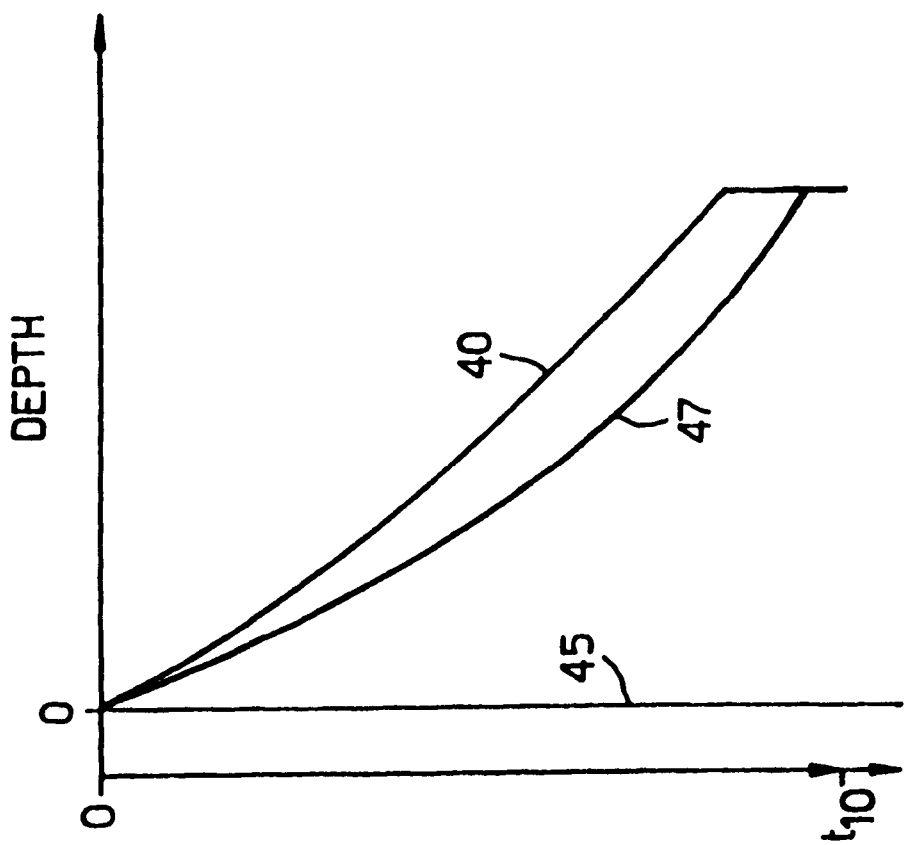
Figure 8B:
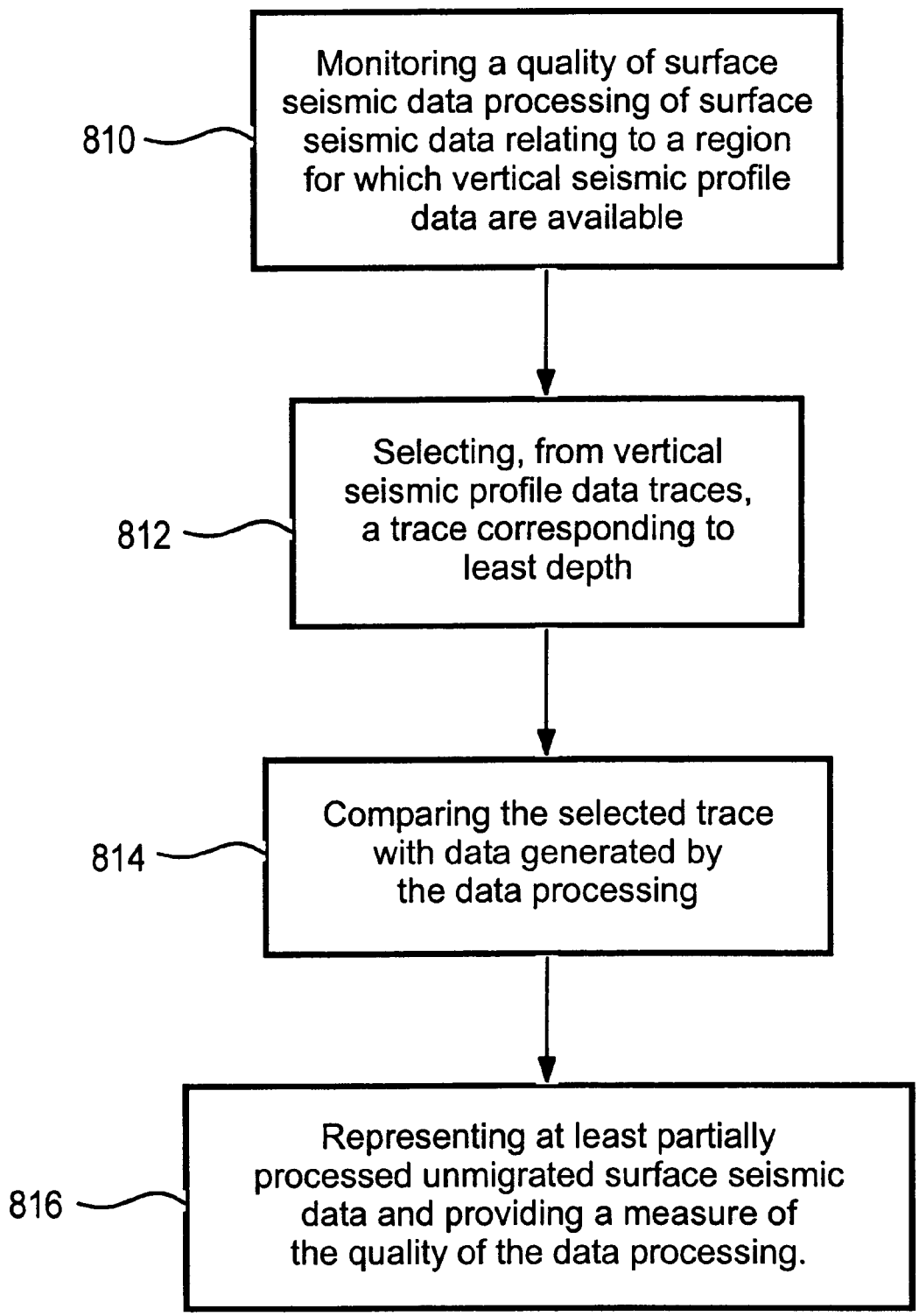
FIG. 8B illustrates a flowchart of a method for an embodiment of the invention.

FIG. 8B illustrates the steps of the method. In the first box, generally indicated by 810, the monitoring of the quality of surface seismic data processing of surface seismic data relating to a region for which vertical seismic profile data are available begins. At some time thereafter, the step of selecting, from vertical seismic profile data traces, a trace corresponding to the least depth is performed in step 812. A comparison of the selected trace with data generated by the data processing is completed in step 816. With the method then having a representation of at least partially processed unmigrated surface seismic data so as to provide a measure of the quality of the data processing, and this is completed in step 818.

Figure 9:
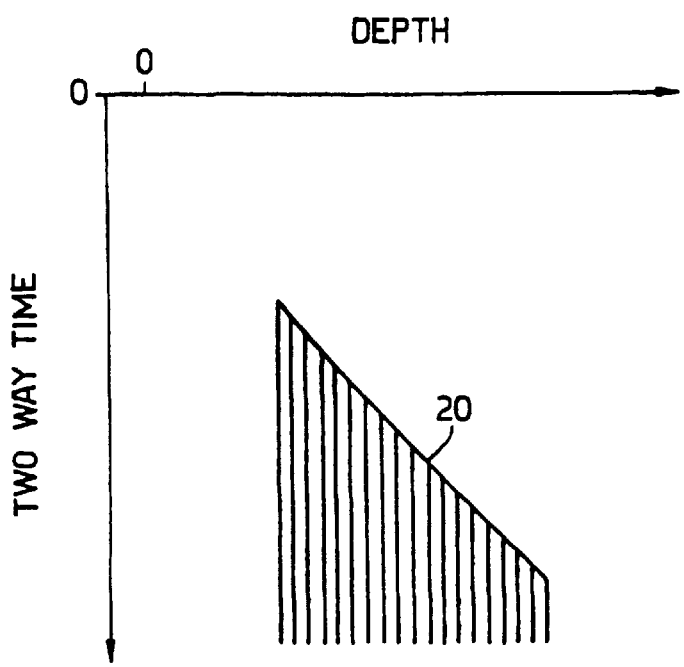
FIG. 9 corresponds to FIG. 5 but illustrates bore hole vertical seismic data obtained for a lower portion only of the bore hole depth.
Figure 10:
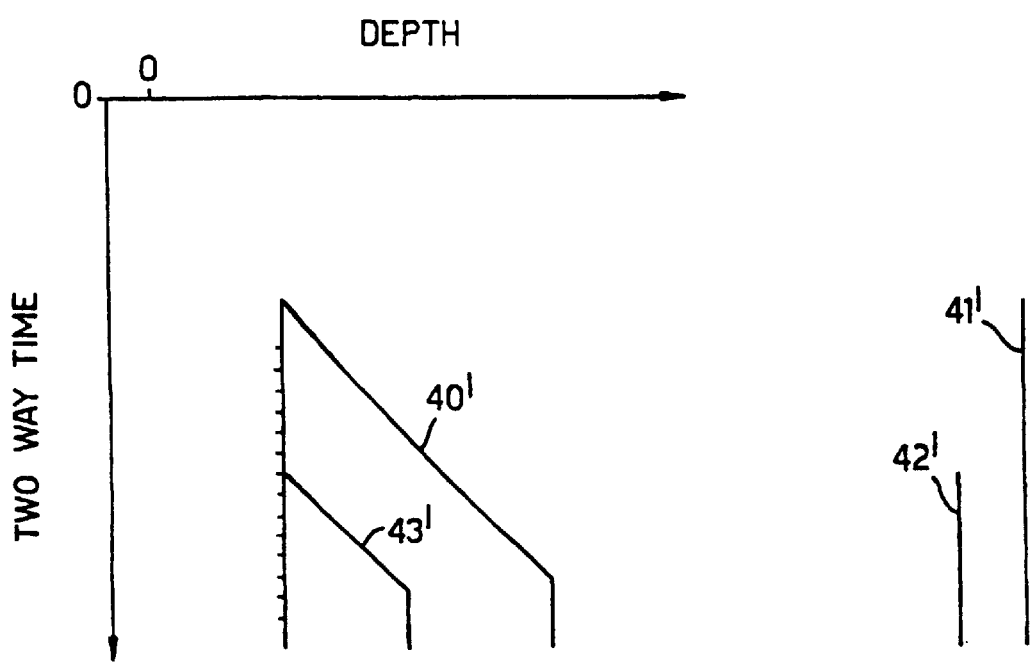
FIG. 10 illustrates section curves of known type similar to those shown in FIG. 6 but for the data shown in FIG. 9.

FIG. 9 illustrates bore hole vertical seismic profile data in which the geophones do not extend as far as the surface. Thus, there are no traces corresponding to the upper part of the bore hole. FIG. 10 illustrates the section curves 40' and 43' of FIG. 6 applied to the data of FIG. 9. The derived traces corresponding to the section curves suffer from the same limitations and disadvantages as described with reference to FIG. 6. The time intervals corresponding to the derived traces are illustrated at 41' and 42'.

Figure 11:
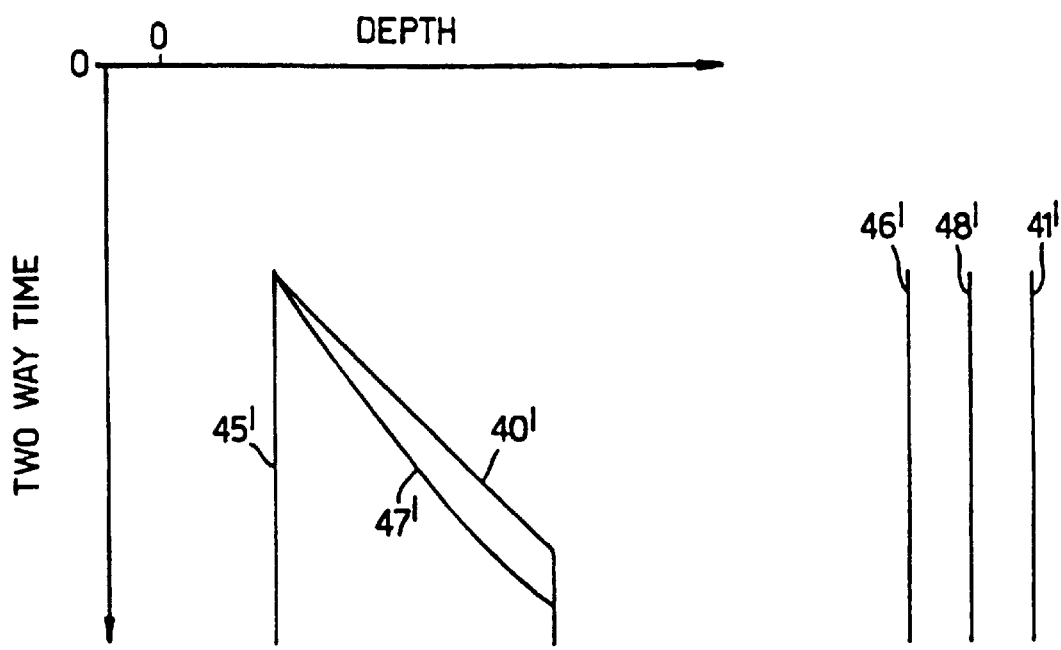
FIG. 11 illustrates section curves for the data shown in FIG. 9 and forming an embodiment of the invention.

FIG. 11 illustrates section curves 40', 45' and 47' corresponding to those shown in FIG. 8 but applied to the data shown in FIG. 9. The temporal extent of the corresponding derived traces are shown by the vertical bars 41', 46' and 48' in FIG. 11. Thus, the derived traces in accordance with the section curves 45' and 47' achieve the same advantages as in the case of FIG. 8.

Figure 12A:
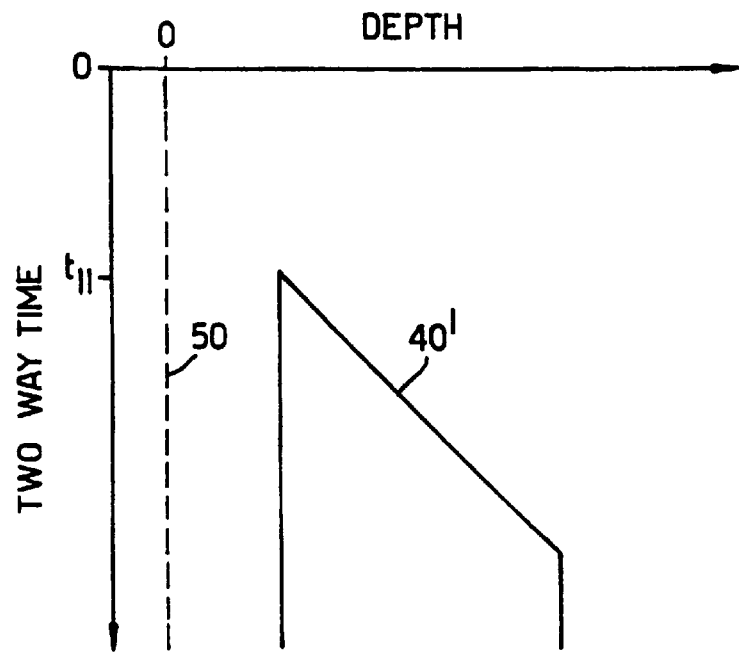
FIG. 12A illustrates extrapolation from the data shown in FIG. 9 together with section curves forming an embodiment of the invention.

FIG. 12A illustrates the derivation of a trace 50 corresponding to zero depth and derived from the data shown in FIG. 9. The trace 50 may be derived in any suitable way, for instance by an extrapolation technique from some or all of the actual traces forming the data shown in FIG. 9. Although not shown, it is also possible to form other traces corresponding to geophone locations between the surface and the uppermost actual geophone location.

As described hereinbefore, the extrapolated trace 50 may itself be used in quality control of surface seismic data processing. Reflection events may be correctly located in the trace 50, for instance using an extrapolation technique which detects reflections from horizontal reflectors and places them at the same time point in the trace 50 and which detects plane dipping reflectors and locates these appropriately in the trace 50 by means of a hyperbolic extrapolation. For example, a model of the subsurface can be used to generate a set of synthetic traces. The synthetic traces are compared with the actual bore hole vertical seismic traces to establish the strength of their correlation. If the correlation is weak, the model can be altered and new synthetic traces can be generated. The newly generated synthetic traces can again be compared with the actual bore hole vertical seismic traces. This process can be repeated until a sufficiently strong correlation is found between the synthetic traces and the actual bore hole vertical seismic traces.

Figure 12B:
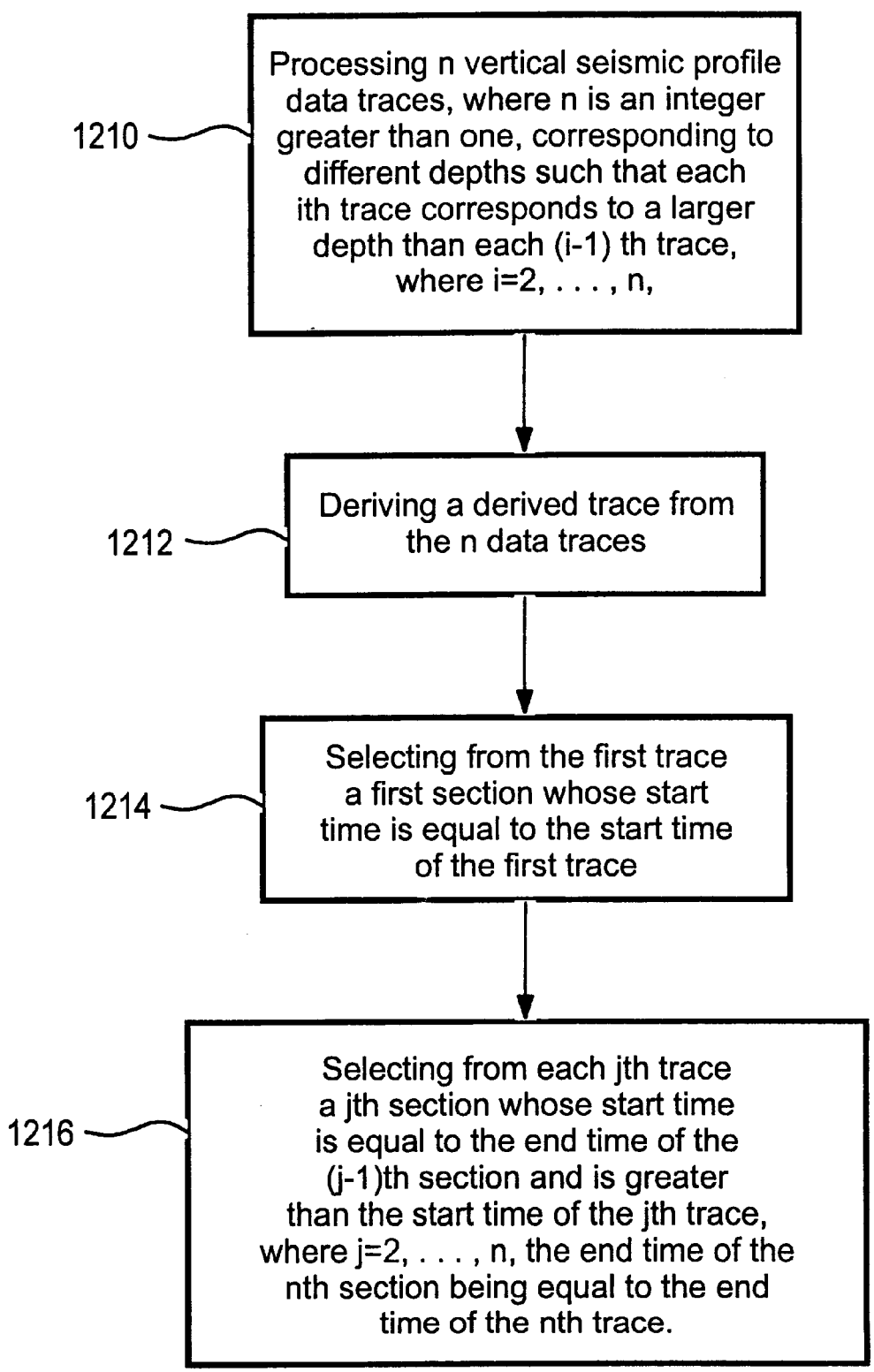
FIG. 12B illustrates a flowchart of a method for an embodiment of the invention.

FIG. 12B illustrates the steps of the method. The processing n vertical seismic profile data traces, where n is an integer greater than one, corresponding to different depths such that each ith trace corresponds to a larger depth than each (i−1)th trace, where i=2, . . . , n, is generally indicated with numeral 1210. The method includes a step of deriving which is generally indicated by numeral 1212 and has derived a trace from the n data traces. As indicated in 1214, this is accomplished by selecting from the first trace a first section whose start time is equal to the start time of the first trace. Subsequently thereto the method as indicated in 1216, selects from each jth trace a jth section whose start time is equal to the end time of the (j−1)th section and is greater than the start time of the jth trace, where j=2, . . . , n, the end time of the nth section being equal to the end time of the nth trace.

Using the model corresponding to the set of synthetic traces which most strongly correlate with the bore hole vertical seismic traces, the trace corresponding to the zero-depth trace may be derived from all or some of the actual actual bore hole vertical seismic traces by an extrapolation technique.

Alternatively, the data from the dipping reflectors can be corrected for hyperbolic moveout and then extrapolated to trace 50 as for horizontal reflectors. For example, a model of the subsurface can be used to calculate a series of time corrections Δt for all or some of the actual bore hole vertical seismic traces. The model is based on a known velocity V, where the angle of dip θ is variable. For a given model, the time corrections Δt are calculated for a particular angle of dip θ and a series of depths and applied to some or all of the bore hole vertical seismic traces. The corrected actual bore hole vertical seismic traces are analyzed and the angle of dip θ is varied until a time correction Δt is obtained where, at each time level, a reflection event is horizontally aligned.

In order to obtain the trace which corresponds to the zero-depth trace 50, the left hand trace is taken, or the traces are summed utilising techniques including, but not limited to, addition or median summing across the corrected actual bore hole vertical seismic data. Other techniques may be employed as alternatives or in addition to the above described techniques, for example, semblance and semblance weighted techniques or cross entropy techniques.

It should be noted that the above example is not limited to a particular time correction technique. For example, if the time correction does not conform to a hyperbolic model, as would be the case if a dipping reflector were not flat, then a different model based correction would be appropriate. Such a correction could be implemented either directly on the actual bore hole vertical seismic data or by comparison with synthetic data.

The trace 50 corresponds to unmigrated zero offset surface seismic data and extends up to a point in time which represents the zero depth version of the real data at its shortest recorded two-way time, i.e. the time represented by the intersection of the shallowest recorded trace 45' and the two way travel time curve 40' in FIG. 11. Thus correlation with a processed data trace over an interval determined by this version of the shortest travel time at the top to any point of the extrapolated real data below can be performed.

As stated hereinbefore, pre-stack surface seismic data may contain data corresponding to multiple reflections. Similarly, energy propagating from a source to a given geophone used to record bore hole vertical seismic traces may also undergo multiple reflections. These traces can be used in conjunction with any of the methods described above in accordance with the present invention.

The multiple reflections are removed using a deterministic method. The subsequent bore hole vertical seismic data without the multiple reflections are then used to derive traces corresponding to zero depth.

The data corresponding to multiple reflections are then reintroduced into the derived traces corresponding to zero depth and used, in the same way as without multiples bore hole vertical seismic data, to monitor the quality of prestack surface seismic data.

Although references have been made above to time traces, i.e. the travel time of a sound wave from a source, it is equally possible to refer to depth traces instead of time traces. These are traces defined in terms of distance travelled instead of time taken and are computed from the recorded time traces utilising known velocities.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of monitoring a quality of surface seismic data processing of surface seismic data relating to a region for which vertical seismic profile data are available, said method comprising the steps of:

selecting, from vertical seismic profile data traces, a trace corresponding to a least depth;

comparing the selected trace with data generated by data processing;

representing at least partially processed unmigrated surface seismic data; and providing a measure of the quality of the data processing.

2. A method as claimed in claim 1, in which the selected trace corresponds to zero depth.

3. A method as claimed in claim 1, in which the vertical seismic profile data traces comprise: a first set of traces which were obtained by seismic data acquisition and all of which correspond to non-zero depth; and a second set comprising a synthetic trace corresponding to zero depth and derived by extrapolation from at least one of the traces of the first set, the selected trace comprising the synthetic trace.

4. A method as claimed in claim 1, in which the comparing step comprises correlation.

5. A method of processing n vertical seismic profile data traces, where n is an integer greater than one, corresponding to different depths such that each ith trace corresponds to a larger depth than each (i−1)th trace, where i=2, . . . , n, the method comprising the steps of:

deriving a derived trace from n data traces;

selecting from the first trace a first section whose start time is equal to the start time of the first trace; and selecting from each jth trace a jth section; said jth section having a start time equal to the end time of the (j−1)th section and is greater than the start time of the jth trace, where j=2, . . . , n, the end time of the nth section being equal to the end time of the nth trace.

6. A method as claimed in claim 5, in which an mth to the nth traces were obtained by seismic data acquisition, where 1<m<n, and the or each lth trace is derived by extrapolation from at least one of the mth to nth traces, where 1<l<m.

7. A method as claimed in claim 5, in which the selected trace corresponds to zero depth.

8. A method of monitoring the quality of surface seismic data processing of surface seismic data relating to a region for which vertical seismic profile data are available, comprising performing a method as claimed in claim 5, and comparing the derived trace with at least partially processed surface seismic data so as to provide a measure of the quality of the data processing.

9. A method as claimed in claim 8, in which the at least partially processed surface seismic data comprise at least partially migrated surface seismic data.

10. A method of monitoring a quality of surface seismic data processing of surface seismic data relating to a region for which vertical seismic profile data are available, said method comprising the steps of:

correcting vertical seismic profile data traces so that reflections on said vertical seismic profile data traces align at the same time, selecting, from the corrected vertical seismic profile data traces, a trace corresponding to a least depth;

comparing the selected trace with data generated by the data processing;

representing at least partially processed unmigrated surface seismic data; and providing a measure of the quality of the data processing.

11. A method as claimed in claim 10, in which the selected trace corresponds to zero depth.

12. A method of monitoring a quality of surface seismic data processing of surface seismic data relating to a region for which vertical seismic profile data are available, said method comprising the steps of:

correcting vertical seismic profile data traces so that reflections on said vertical seismic profile data traces align at the same time, deriving a trace from two or more of the corrected vertical seismic profile data traces, comparing the sum trace with data generated by the data processing, representing at least partially processed unmigrated surface seismic data, and providing a measure of the quality of the data processing.

13. A method as claimed in claim 12, in which the sum trace corresponds to zero depth.

* * * * *